F. M. FLEMING.
BICYCLE SEAT.
APPLICATION FILED DEC. 20, 1909.
969,096.
Patented Aug. 30, 1910.
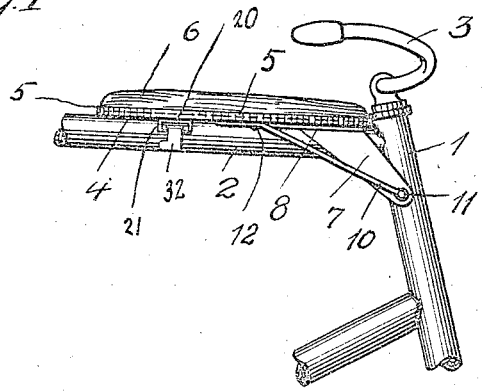
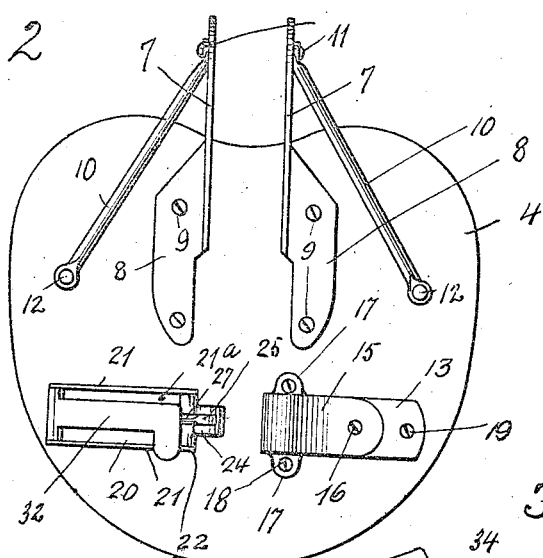
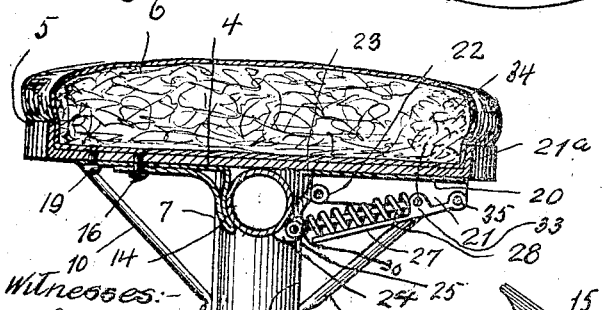
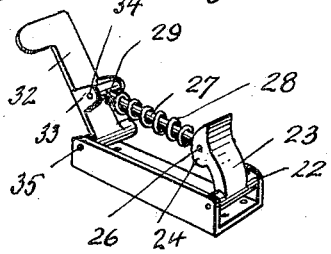
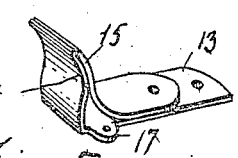
Witnesses:
Samuel Payne
R. H. Butler
Inventor
F. M. Fleming
by H. C. Everts Co.
Attorneys

UNITED STATES PATENT OFFICE.

FRANK M. FLEMING, OF HUNTINGTON BEACH, CALIFORNIA.

BICYCLE-SEAT.

969,096.  Specification of Letters Patent.  Patented Aug. 30, 1910.

Application filed December 20, 1909. Serial No. 534,232.

*To all whom it may concern:*

Be it known that I, FRANK M. FLEMING, a citizen of the United States of America, residing at Huntington Beach, in the county of Orange and State of California, have invented certain new and useful Improvements in Bicycle-Seats, of which the following is a specification, reference being had therein to the accompanying drawing.

This invention relates to a bicycle seat for children's use and the object thereof is to provide in a manner as hereinafter set forth and claimed what may be termed a child's bicycle seat adapted to be detachably secured to the bicycle frame forwardly of the saddle, whereby a bicycle can be utilized for carrying a child forwardly of the rider and without any inconvenience to the rider.

A further object of the invention is to provide a child's bicycle seat in a manner as hereinafter set forth and claimed which is adapted for use in connection with varying sizes of bicycle frames without the employing of additional hold-fast devices for securing the seat in position.

Further objects of the invention are to provide a child's bicycle seat which shall be simple in its construction, strong, durable, readily secured to and removed from the bicycle frame, not interfering with the rider of the bicycle, automatically adjustable so as to adapt itself for use in connection with the varying sized bicycle frames, and inexpensive to manufacture.

With the foregoing and other objects in view, the invention consists of the novel construction, combination and arrangement of parts as hereinafter more specifically described and illustrated in the accompanying drawings, wherein is shown the preferred embodiment of the invention, but it is to be understood that changes, variations and modifications can be resorted to which come within the scope of the claims hereunto appended.

In the drawings wherein like reference characters denote corresponding parts throughout the several views: Figure 1 is a side elevation of a portion of a bicycle frame showing the adaptation therewith of a child's seat in accordance with this invention. Fig. 2 is an inverted plan of the seat with the parts in an inoperative position. Fig. 3 is a cross-section of the seat, looking in the direction toward the steering head of the bicycle. Fig. 4 is a detail perspective of the adjustable spring-controlled seat clamping device, and, Fig. 5 is a detail perspective of the abutment.

Referring to the drawings by reference characters, 1 denotes the steering head of a frame, 2 the cross bar which is connected to the head 1 and to the saddle post (not shown) and 3 the handle bars. The foregoing elements may be of any suitable construction.

A child's bicycle seat in accordance with this invention comprises a base plate 4 which is preferably constructed of metallic material and provided with a continuous rim 5, the contour of the base 4 being somewhat arch-shaped. Mounted upon the base 4 and closed by the rim 5 is a cushion 6 of a contour similar to that of the base and which projects above the rim 5. The base 4 at its forward end has depending therefrom a pair of forwardly inclined brackets 7 which are adapted to engage the sides of the steering head, these brackets snugly engage the steering head at their lower portions and at their upper ends are off-set as at 8. The off-set portions 8 of the brackets 7 abut against the lower face of the base 4 and are secured to the base through the medium of the hold-fast devices 9. The lower portions of the bracket 7 are maintained in position through the medium of inclined brace members 10 which at their lower ends are secured by the hold-fast devices 11 to the bracket 7 and at their upper ends are connected by the hold-fast devices 12 to the base 4. The seat when in position is mounted upon the bar 2 and arranged in close proximity to the steering head 1, the bracket 7 engaging the steering head and the cushioned seat 6 projecting above the handle bars 3 as clearly shown in Fig. 1.

Secured to and depending from the lower face of the base 4 is an angle-shaped abutment which is adapted to bear against the bar 2 and the said angle-shaped abutment consists of a base 13 terminating at one end in a right-angularly-disposed grooved extension 14, the latter terminating in an inclined brace 15. The brace 15 is secured to the base 13 by the hold-fast device 16, the latter also connects the base 13 to the base 4. The base 13 is formed with laterally-extending apertured lugs 17 through which extend hold-fast devices 18 which constitute an additional securing means for coupling the base 13 to the base 4 and the said base 13 is furthermore secured to the base 4 by the hold-fast device 19 which extends through the said base. The angle-shaped abutment is arranged at the rear of the seat 5 and opposing said angle-shaped abutment is an automatically adjustable and spring-controlled locking clamp for securing in connection with the angle-shaped abutment, the seat to the bar 2.

The locking clamp consists of a plate 20 secured by the hold-fast devices 21ª to the base 4 and provided with longitudinally-extending depending flanges 21. Pivotally connected by the bar 22 to the inner end of the flanges 21 is a clamping plate 23 which when in position is adapted to engage the bar 2 whereby the latter will be secured between the plate 23 and the angle-shaped abutment, the seat will then be connected in position to the bicycle frame. The clamping plate 23 at its upper end is formed with a pair of outwardly extending lugs 24 between which extends the inner section 25 of an extensible bolt, said inner section 25 is pivotally connected to the lugs 24 by a pin 26 and the said inner section 25 extends in the outer section 27 of the bolt, the said section 27 being hollow for the reception of the section 25. Surrounding the sections 25 and 27 is an extensible and contractible spring 28 having its outer end as at 29 connected to the outer section 27 and its inner end as at 30 connected to the inner section 25. The reference character 31 denotes an operating lever provided with a handle 32 and furthermore provided with a pair of lugs 33 which are pivotally connected as at 34 to the outer end of the outer section 27 of the bolt. The lever 31 is pivotally connected to the outer end of the flanges 21 by the bolts 35.

It will be assumed that the position of the elements of the seat is that as shown in Fig. 2 and it is desired to couple the seat to the frame, the seat is inverted and mounted upon the bar 2, with the brackets 7 straddling the steering head 1, the extension 14 of the angle-shaped abutment bearing against the bar 2, the lever 31 is swung inwardly whereby the clamping plate 23 is brought to engagement with the bar 2 and said plate in connection with the extension 14 couples the seat with the frame.

When it is desired to release the seat from the frame, the lever 31 is swung outwardly whereby the clamping plate 23 is moved from its overlapping position in connection with the bar 2 and the seat can then be left off the frame.

The extensible bolt provides means whereby the clamping device can be used in connection with bars of varying diameter for the reason that the sections of the bolt are connected together by the extensible and contractible spring 28 which will readily adjust itself so that the clamping plate 23 can be shifted inwardly or outwardly, when moved to clamping position, depending upon the diameter of the bar 2, that is to say, if the diameter of the bar 2 is smaller than that as shown, the spring will force the plate 23 inwardly. If the bar is of greater diameter, it is evident that the plate 23 will be forced outwardly, but the spring in connection with the lever 31 will maintain the plate 23 in clamping position.

The brackets 7 not only constitute guiding means to properly position the seat but further constituting means to prevent shifting of the forward portion of the seat with respect to the steering head, the braces 10 prevent the bending of the brackets 7 is obvious, when said brackets are in their operative position with respect to the steering head.

What I claim is:

1. A child's bicycle seat comprising a base, retaining brackets depending from the seat and adapted to straddle the steering head of a bicycle frame, an abutment depending from said base and adapted to engage the top bar of the bicycle frame, and a spring-controlled clamping device depending from the base and adapted to engage the top bar of the frame whereby said bar is clamped between said device and said abutment and the base retained in position upon said bar.

2. A child's bicycle seat comprising a base, retaining brackets depending from the seat and adapted to straddle the steering head of a bicycle frame, an abutment depending from said base and adapted to engage the top bar of the bicycle frame, and an automatically adjustable - spring - controlled clamping device depending from the base and adapted to engage the top bar of the frame whereby said bar is clamped between said device and said abutment and the base retained in position upon said bar.

3. A child's bicycle seat comprising a base, retaining brackets depending from the seat and adapted to straddle the steering head of a bicycle frame, an abutment depending from said base and adapted to engage the top bar of the bicycle frame, a pivoted clamping plate depending from said base and adapted to engage the top bar of the frame and in connection with said abutment connecting the base to said top bar, an extensible bolt pivotally connected to said clamping plate and to the base and adapted to maintain said plate in clamping position, and a combined locking and releasing lever for said bolt, said lever pivoted to the bolt and with the base.

In testimony whereof I affix my signature in the presence of two witnesses.

FRANK M. FLEMING.

Witnesses:
R. E. GRAVES,
LOLA NEWMAN.